United States Patent
Haran et al.

(10) Patent No.: US 7,301,968 B2
(45) Date of Patent: Nov. 27, 2007

(54) COMMUNICATION PROTOCOL FOR PASSIVE OPTICAL NETWORK TOPOLOGIES

(75) Inventors: Onn Haran, Kfar Saba (IL); Ariel Maislos, Or Yehuda (IL); Lior Khermosh, Givatayim (IL)

(73) Assignee: PMC-Sierra Israel Ltd., Herzliya Pituach (IL)

( * ) Notice: Subject to any disclaimer, the term of this patent is extended or adjusted under 35 U.S.C. 154(b) by 1152 days.

(21) Appl. No.: 10/091,141

(22) Filed: Mar. 4, 2002

(65) Prior Publication Data

US 2002/0196801 A1    Dec. 26, 2002

Related U.S. Application Data

(60) Provisional application No. 60/297,171, filed on Jun. 7, 2001, provisional application No. 60/272,967, filed on Mar. 2, 2001.

(51) Int. Cl.
*H04J 3/06* (2006.01)

(52) U.S. Cl. ...................................... 370/508

(58) Field of Classification Search .............. None
See application file for complete search history.

(56) References Cited

U.S. PATENT DOCUMENTS

| | | | |
|---|---|---|---|
| 5,559,624 A | 9/1996 | Darcie et al. | |
| 5,572,349 A | 11/1996 | Hale et al. | |
| 5,920,627 A | 7/1999 | Mionet et al. | |
| 5,926,478 A | 7/1999 | Ghaibeh et al. | |
| 5,978,374 A | 11/1999 | Ghaibeh et al. | |
| 6,097,736 A | 8/2000 | Proctor et al. | |
| 6,711,264 B1* | 3/2004 | Matsumoto et al. | 380/283 |
| 6,801,547 B1* | 10/2004 | Boyd et al. | 370/508 |
| 6,895,189 B1* | 5/2005 | Bedrosian | 398/155 |
| 7,154,879 B1* | 12/2006 | Pfeffer et al. | 370/352 |
| 2002/0110155 A1* | 8/2002 | Pearce et al. | 370/519 |

* cited by examiner

*Primary Examiner*—Doris H. To
*Assistant Examiner*—Christopher Grey
(74) *Attorney, Agent, or Firm*—Mark M. Friedman

(57) ABSTRACT

A protocol for communicating data on a passive optical network conforming to the Ethernet standard provides processes for remote network node discovery and synchronization. Uplink packet transmissions to a central controller, such as an optical line terminal, are scheduled by the central controller. Downlink packets from the central controller to a remote network node, such as an optical network unit, are encrypted to preserve privacy, and the key used for encryption is changed periodically. The protocol further provides processes for detecting the loss of physical or logical connection between the central controller and the remote network nodes.

31 Claims, 7 Drawing Sheets

COMMUNICATION PROTOCOL FOR PASSIVE OPTICAL NETWORK TOPOLOGIES

RELATED APPLICATION

This application claims priority benefit of provisional U.S. patent application Ser. No. 60/272,967, filed 2 Mar. 2001, entitled Ethernet PON; and priority benefit of provisional U.S. patent application Ser. No. 60/297,171, filed Jun. 7, 2001 entitled Ethernet PON, which applications are hereby incorporated by reference for all purposes.

BACKGROUND OF THE INVENTION

1. Field of the Invention

The present invention relates generally to point-to-multipoint telecommunication systems. More particularly, the invention relates to packet-based protocols for bi-directional data interchange on a Passive Optical Network (PON).

2. Background

With the explosion of the Internet content and other multimedia services, telephone line modems are becoming progressively less adequate as means for connecting personal computers to high-speed networks. Several access systems with higher bandwidth capabilities have evolved, including Integrated Services Digital Network (ISDN), Digital Subscriber Line (DSL), and cable modems. These and similar systems are typically bandwidth-limited to rates of the order of several megabits per second. It is desirable to increase the connection rates further to satisfy the growing end-user demand for bandwidth.

Because of its many advantages, optical fiber is widely used in telecommunication systems. The advantages include low signal attenuation, immunity to electromagnetic interference, low crosstalk, fast propagation speed, physical flexibility, small size, low weight, and, most important, high bandwidth. Bringing optical fiber to the end-users is therefore desirable for a number of reasons, including the higher bandwidth that optical fiber would make available to the end-users. But the expense of installing optical fiber in place of the copper wires that typically connect each individual end-user to the central office remains high.

Passive optical network topology provides a good match with the need to connect multiple users to a central point. A passive optical network is an optical transmission system that brings optical fiber to the end-user without requiring individual fiber optic links from each end-user to the central office. Depending on its points of termination, a passive optical network can be called fiber-to-the-curb (FTTC), fiber-to-the-building (FTTB), or fiber-to-the-home (FTTH) network. A passive optical network typically includes a central controller, such as an optical line terminal, at the communication company's office, and a plurality of remote network nodes, such as optical network units or customer premises equipment, located near end-users of the network. In a PON, the central controller and the remote network nodes are interconnected by optical fiber and optical splitters/combiners ("splitters" hereinafter).

FIG. 1 illustrates the topology of a representative passive optical network 100. Reference numeral 110 designates an optical line terminal (OLT) that communicates with multiple optical network units (ONUs) over the PON 100. The signals broadcast from the OLT 110 travel through optical fiber spans 140 and passive splitters 120, and are received by the ONUs 130. Each ONU 130-N corresponds to a discrete end-user or application. The signals sent by the ONUs 130 travel in the reverse direction to the OLT 110.

Note that the PON topology differs from the "star" configuration where each end-user is connected to a central location by a dedicated circuit, which may be a dedicated physical or virtual circuit. The topological differences are important for at least two reasons. First, the OLT 110 broadcasts (point-to-multipoint) over PON 100, so that every ONU 130-N receives the broadcasts. Broadcasting raises privacy concerns because each ONU receives not only the transmissions intended for it, but also all other transmissions from the OLT 110. Second, the uplink transmissions (from the ONUs 130-N to the OLT 110) must be multiplexed because the multiple ONUs 130-N must share the total bandwidth available on the shared transmission medium of network span 140-1. Preferably, the available bandwidth should be allocated dynamically and adaptively.

Because of the need to multiplex and the need to secure downlink communications, protocols used in star topologies may not work well in PON topologies. A need therefore exists for a flexible and efficient communication protocol that will provide multiplexing for secure point-to-multipoint communications over a passive optical network topology.

SUMMARY OF THE INVENTION

In accordance with the principles of this invention, a protocol is provided for transferring data between a central controller and a first remote network node of a plurality of remote network nodes connected by a network with passive optical network topology. The remote controller discovers the first remote node by sending a GATE control message to all remote nodes that have not been discovered. The GATE message includes a time stamp and a definition of a time period within which the undiscovered remote nodes may respond to the GATE message. The first remote node receives the GATE message, sets its internal clock to the time stamp, and responds with a REGISTER_REQ control message that identifies the first remote node to the central controller. The central controller receives the REGISTER_REQ message and sends a REGISTER control message to the first remote node. The first remote node thus becomes discovered. Thereafter, the central controller sends additional GATE messages to the first remote node, authorizing uplink transmissions from the first remote node at specific times. To preserve privacy of the downlink transmissions, the transmissions to the first remote node are encrypted with a key known to the first remote node, but is not known to other remote nodes residing on the network.

BRIEF DESCRIPTION OF THE DRAWINGS

The present invention will be explained, by way of examples only, with reference to the following description, appended claims, and accompanying figures where:

DETAILED DESCRIPTION

Figure 1:
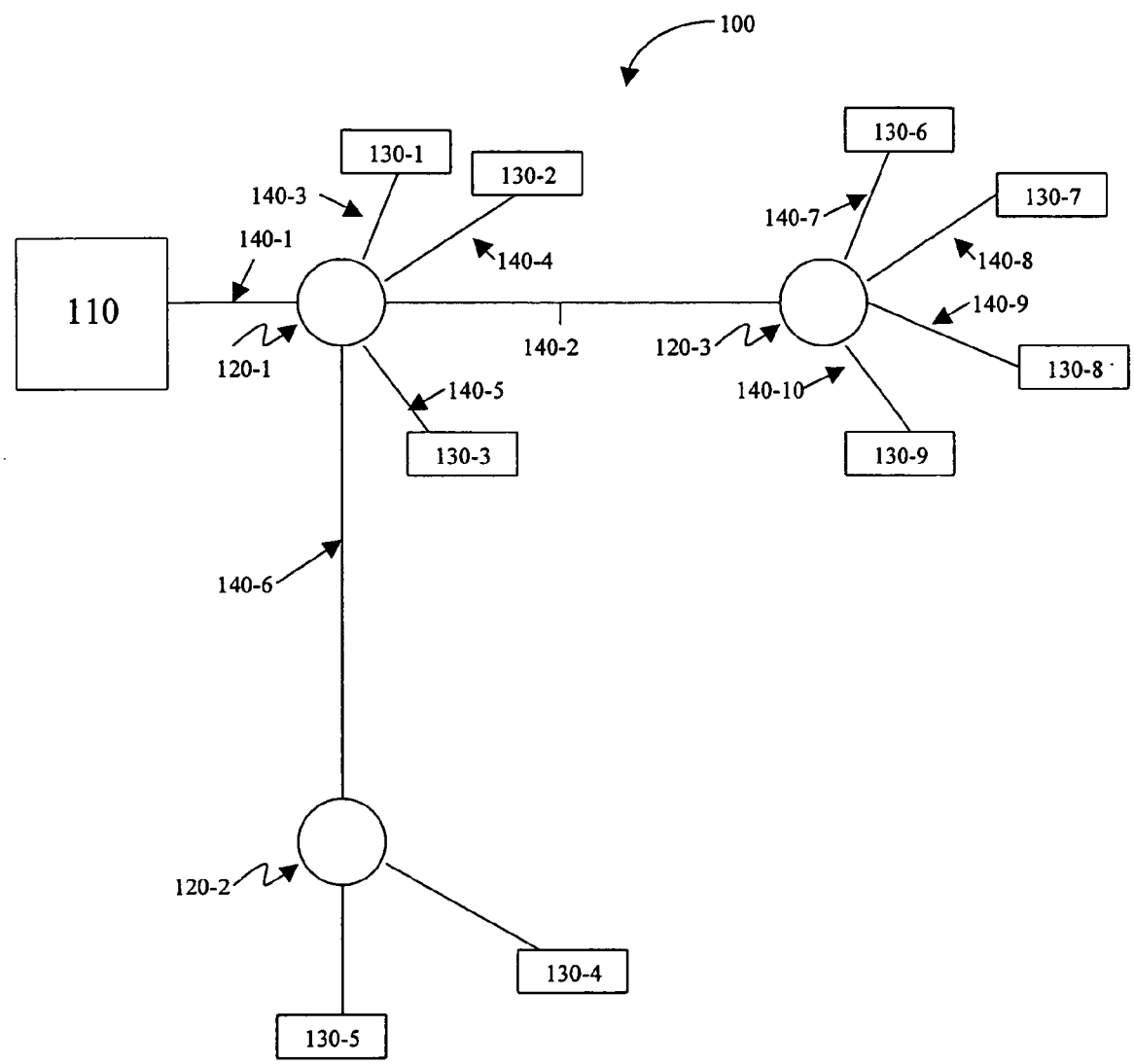
FIG. 1 illustrates the passive optical network topology.

Referring again to FIG. 1, the OLT 110 transmits packets or frames downlink to the ONUs 130-N. The downlink transmissions pass through the optical fiber spans 140 and passive splitters 120, reaching all the ONUs 130-N. Uplink packet or frame transmissions pass through only those splitters and spans that lie between the OLT 110 and the particular ONU that sent the particular transmission. For example, a transmission from ONU 130-4 would travel to the OLT 110 through spans 140-11, 140-6, and 140-1, as well as through optical splitters 120-2 and 120-1. Because of the physical properties of passive optical splitters, the OLT 110 receives the signal attenuated only by the small losses in the fiber and the splitters; other ONUs 130-N receive only faint reflections of the signal.

Downlink and uplink transmissions can be separated in various ways, for example, by using different wavelengths or separating the signals using the directional quality of light. Thus, the uplink and downlink transmissions may overlap each other.

To prevent collisions between uplink transmissions sent from different ONUs 130-N, a time-division multiplexing (TDM) scheme is used, with the different ONUs 130-N transmitting packets at different times. It follows that the internal clocks of the OLT 110 and the ONUs 130-N should be synchronized. Preferably, the internal clocks of the ONUs 130-N are synchronized to the internal real-time clock of the OLT 110. In a first exemplary non-limiting embodiment, the real-time clock has a period of 16 nanoseconds and is stored in a 32-bit real-time clock register. When the clock reaches its maximum count (e.g., "FFFF FFFF"), the clock wraps around and starts counting from all "0."

An ONU's clock is generally synchronized with the OLT's real-time clock when the ONU is "discovered" by the OLT. Often, the discovery and synchronization processes occur when the ONU comes on-line. In operation, the sequence of discovery and clock synchronization proceeds as described below with respect to a second exemplary non-limiting embodiment.

When the ONU comes on-line, it is initially in the undiscovered state. In this state, the ONU may not transmit packets to the OLT because any unauthorized transmission can collide with authorized transmissions from other, discovered ONUs. While in the undiscovered state, the ONU listens for a GATE message addressed to all undiscovered ONUs. The GATE message authorizes all undiscovered ONUs to transmit to the OLT, in order to become discovered. A representative GATE message is graphically illustrated in Table 1 below. Note that the GATE message and other control messages can be characterized by their Media Access Control (MAC) opcodes.

TABLE 1 graphical illustration of a GATE message

| Field name | Length | Description |
| --- | --- | --- |
| Source Address | 6 bytes | Address of the OLT |
| Destination address | 6 bytes | Multicast/Address of the ONU |
| Packet type | 2 bytes | MAC control 0x8808 |
| MAC control opcode | 2 bytes | GATE OPCODE |
| Timestamp | 4 bytes | Value of current local clock |
| Number of grants | 1 byte | Describes the number of grants included in this message (1 to 6). When the MSB is 1, then discovery indication is set |
| Grant 0 start time | 4 bytes | The time that ONU can start transmit at |
| Grant 0 length | 2 bytes | Maximal transmission time |
| ... | | |
| Grant N start time | 4 bytes | Same description as Grant 0 start time |
| Grant N length | 2 bytes | Same description as Grant 0 length |

The GATE message includes the current OLT time stamp, i.e., the value of the OLT's real-time clock when the GATE message was sent. (We will refer to the OLT clock as the PON clock.) The GATE message further includes the grant start time and grant length values in the appropriate fields. The grant start time is the time (according to the PON clock) when the undiscovered ONUs are allowed to begin uplink transmissions, and the grant length is the length of time the undiscovered ONUs are allowed to transmit. As illustrated in Table 1, multiple authorizations to transmit may be included in the same GATE message.

The GATE message optionally includes OLT's parameters, for example, the time required for the OLT to lock onto a signal; OLT's automatic gain control circuit adjustment time; and protocol constants, such as the timers described below.

When the undiscovered ONU receives the GATE message, it loads its internal clock with the received value of the PON clock. From this point on, the ONU is synchronized with the OLT. For improved clock synchronization, the ONU may load its internal clock with the values of PON clock whenever the ONU receives a time-stamped message from the OLT.

The undiscovered ONU is allowed to transmit its REGISTER_REQ message when the PON clock reaches the grant start value. Typically, a REGISTER_REQ message includes the ONU's time stamp and various negotiation parameters. The negotiation parameters may include, for example, the time required for the ONU's laser to stabilize after turn-on; the time required to turn off the ONU's laser; and protocol buffer sizes for uplink transmissions. The REGISTER_REQ message may further include an acknowledgement of the OLT's capabilities described in the GATE message. A representative REGISTER_REQ message is graphically illustrated in Table 2 below.

TABLE 2 graphical illustration of REGISTER_REQ message

| Field name | Length | Description |
| --- | --- | --- |
| Source Address | 6 bytes | Address of the ONU |
| Destination address | 6 bytes | Address of the OLT/multicast address |
| Packet type | 2 bytes | MAC control 0x8808 |
| MAC control opcode | 2 bytes | REGISTER_REQ_OPCODE |
| Timestamp | 4 bytes | Value of current local clock |
| Capabilities | N bytes | Optional |

For collision avoidance, the ONU may delay its transmission of the REGISTER_REQ message by a period in the range of 0 to (<grant length>−<REGISTER_REQ transmission time>). In the second exemplary non-limiting embodiment, the delay period is randomly and uniformly distributed within this range. As persons skilled in the art will recognize, the upper limit of the delay range guarantees that the transmission of the REGISTER_REQ message will not extend beyond the time interval allocated for uplink transmissions from the undiscovered ONUs.

If a collision between the REGISTER_REQ messages from multiple undiscovered ONUs does occur, the undiscovered ONUs back off and wait until the next regular GATE message is sent to them. The undiscovered ONUs then participate in the discovery process from the beginning. The collision may be detected by the OLT if the OLT has collision detection hardware, and the OLT may increase the grant length value in the subsequent GATE message, thereby increasing the discovery window and decreasing the probability of collisions. Alternatively, the collision can be ignored.

The OLT detects the existence of a previously undiscovered ONU when the OLT receives a valid REGISTER_REQ message. The identity of the ONU is known from the source address field of the REGISTER_REQ message. In a third exemplary non-limiting embodiment, the OLT subtracts the value received in the time stamp field of the REGISTER_REQ message from the OLT's current real-time clock value to calculate the round trip delay between the OLT and the ONU. The calculated delay corresponds to the distance between the two nodes.

In the final step of the discovery process, the OLT transmits a REGISTER message to the ONU. The REGISTER message directs the ONU to switch its state to discovered state, and may also include an acknowledgement of some of the negotiation parameters transmitted by the ONU in its REGISTER_REQ message. A representative REGISTER message is graphically illustrated in Table 3 below.

TABLE 3 graphical illustration of a REGISTER message

| Field name | Length | Description |
| --- | --- | --- |
| Source Address | 6 bytes | Address of the OLT |
| Destination address | 6 bytes | Address of the ONU |
| Packet type | 2 bytes | MAC control 0x8808 |
| MAC control opcode | 2 bytes | REGISTER_OPCODE |
| Timestamp | 4 bytes | Value of current local clock |
| Capabilities | N bytes | Optional |

Figure 2:
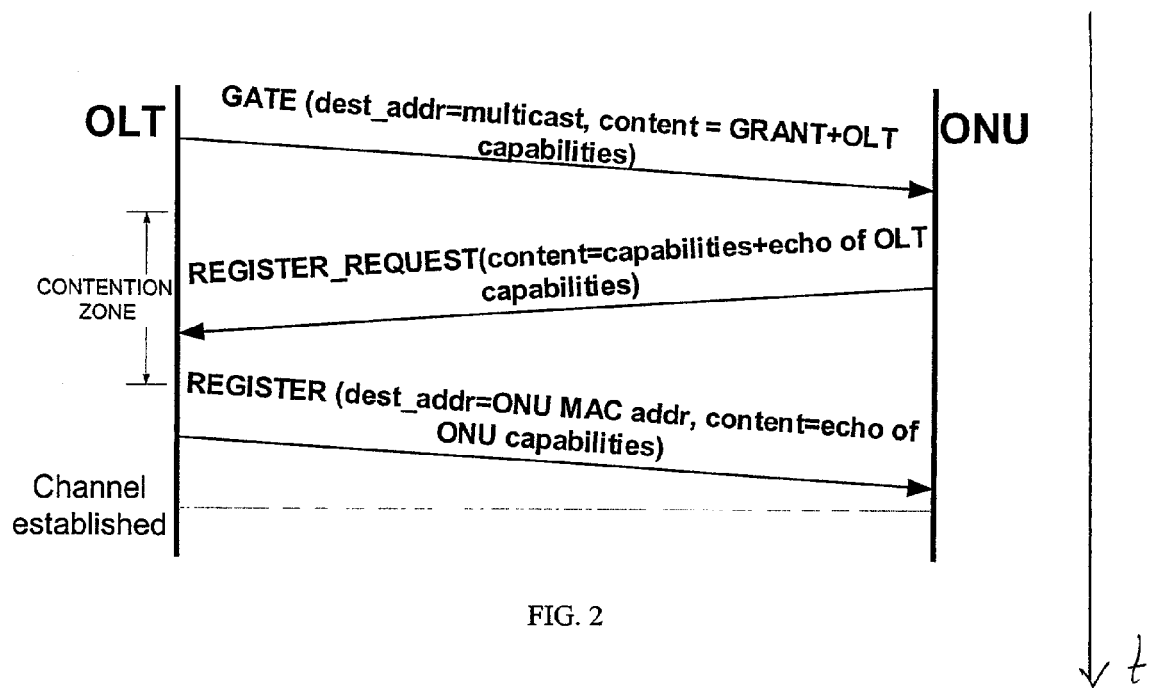
FIG. 2 illustrates the process of discovery of a remote network node by a central controller.

When the ONU receives the REGISTER message, it switches its state to "discovered," as directed by the REGISTER message. The discovery process, illustrated in FIG. 2, is now complete.

Figure 3:
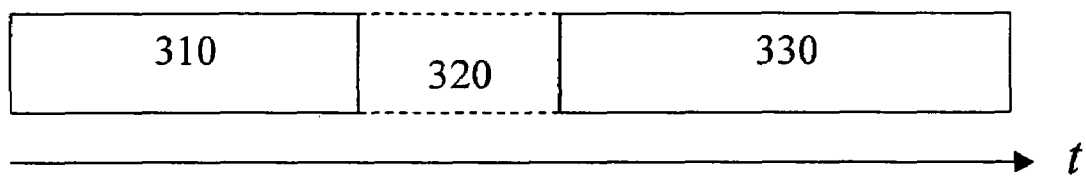
FIG. 3 illustrates back-to-back uplink data transmissions from two different optical network units.

Generally, the GATE messages are used not only in the course of the discovery process, but also to allow the OLT to control uplink transmissions. In a fourth exemplary non-limiting embodiment, the OLT controls uplink data transmissions by performing scheduling calculation and transmitting GATE messages toward the ONUS. An ONU is allowed to transmit only if it has been authorized by a grant received in a GATE message from the OLT. Collision-free transmissions from ONUs are guaranteed because the OLT assigns grants without overlap. When in discovered state, the ONU preferably starts to transmit immediately after its local clock equals to the grant start time. This is illustrated in FIG. 3, where ONU #1 transmits during time interval 310, and ONU #2 transmits during time interval 330. Note that the OLT inserts a guard band 320 between consecutive transmissions from different ONUs to prevent collisions that might otherwise result because of the small differences between the local clocks of the two ONUs.

As illustrated in Table 2 above, several grants can be packed into a single GATE message to increase bandwidth utilization. Each grant contains a grant start time value and a grant length value in appropriate fields, thereby informing the addressed ONU when to start its transmission and the maximum length of the transmission.

Each ONU may participate in the process of bandwidth allocation by requesting bandwidth in a REPORT message. Note that the REPORT message is sent when the ONU receives a grant, i.e., an authorization to transmit. The REPORT message may contain the number of bytes the ONU requests to transmit per local queue, and one or more priorities, such as the priorities defined in the IEEE 802.1 standard. A representative REPORT message is graphically illustrated in Table 4 below.

TABLE 4 graphical illustration of a REPORT message

| Field name | Length | Description |
| --- | --- | --- |
| Source Address | 6 bytes | Address of the ONU |
| Destination address | 6 bytes | Address of the OLT/Multicast |
| Packet type | 2 bytes | MAC control 0x8808 |
| MAC control opcode | 2 bytes | REPORT_OPCODE |
| Timestamp | 4 bytes | Value of current local clock |
| Queue #0 request | 4 bytes | Number of bytes requested for priority queue #0 |
| Queue #1 request | 4 bytes | Number of bytes requested for priority queue #1 |
| Queue #2 request | 4 bytes | Number of bytes requested for priority queue #2 |
| Queue #3 request | 4 bytes | Number of bytes requested for priority queue #3 |
| Queue #4 request | 4 bytes | Number of bytes requested for priority queue #4 |
| Queue #5 request | 4 bytes | Number of bytes requested for priority queue #5 |
| Queue #6 request | 4 bytes | Number of bytes requested for priority queue #6 |
| Queue #7 request | 4 bytes | Number of bytes requested for priority queue #7 |

The OLT need not explicitly acknowledge the REPORT message. A smart scheduler in the OLT simply uses the reported values to optimize bandwidth allocation among the different ONUs, and the OLT sends GATE messages in accordance with the scheduler's output. The scheduler need not consider any specific reported values, and may in fact ignore all the reported values by allocating bandwidth based, for example, on a predefined fairness algorithm, or on the end-users' service classifications.

In a fifth exemplary non-limiting embodiment, both the ONU and the OLT detect loss of physical or logical connection between them. To detect loss of connection, the OLT runs a timeout routine with timers corresponding to the individual discovered ONUs. The timeout routine monitors receipt of REPORT messages (or of other messages) from the individual ONUs. After a message is successfully received from an ONU, the timeout routine resets the corresponding timer. If one of the timeout timers reaches a preprogrammed threshold value before being reset, the OLT assumes that the connection with the ONU corresponding to the timer has been interrupted. The OLT then switches the ONU to undiscovered state.

The OLT is allowed to switch an ONU to the undiscovered state by issuing, for example, a GATE message to the ONU with a discovery indication directing the ONU to change its state. (A special control message may also be used for this purpose.) When the ONU receives this message, it releases all its pending grants and switches its state to undiscovered. The ONU can then participate in the next discovery process.

Figure 4:
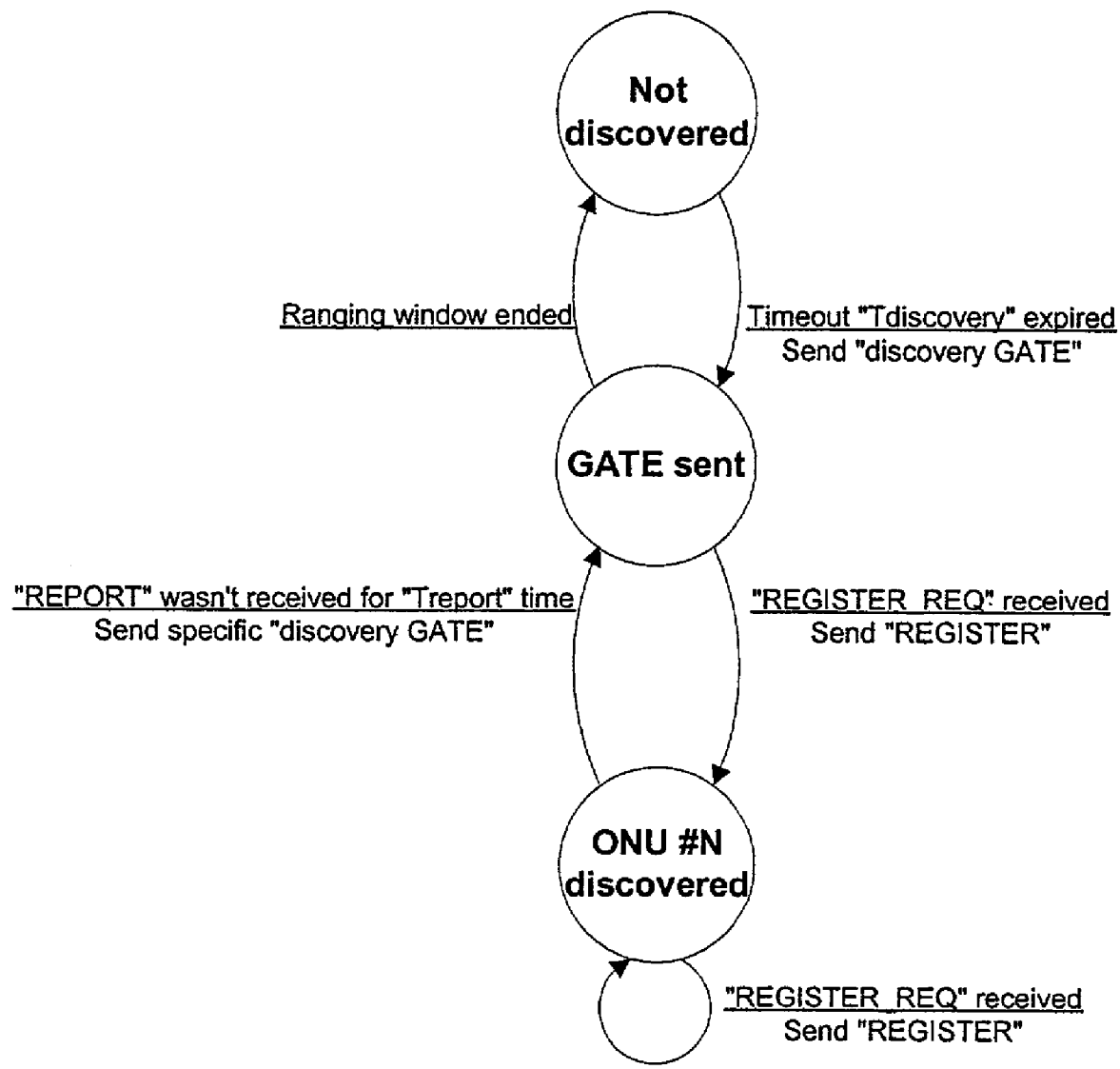
FIG. 4 illustrates a diagram of an OLT's state machine controlling the processes of ONU discovery and detection of loss of connection.
Figure 5:
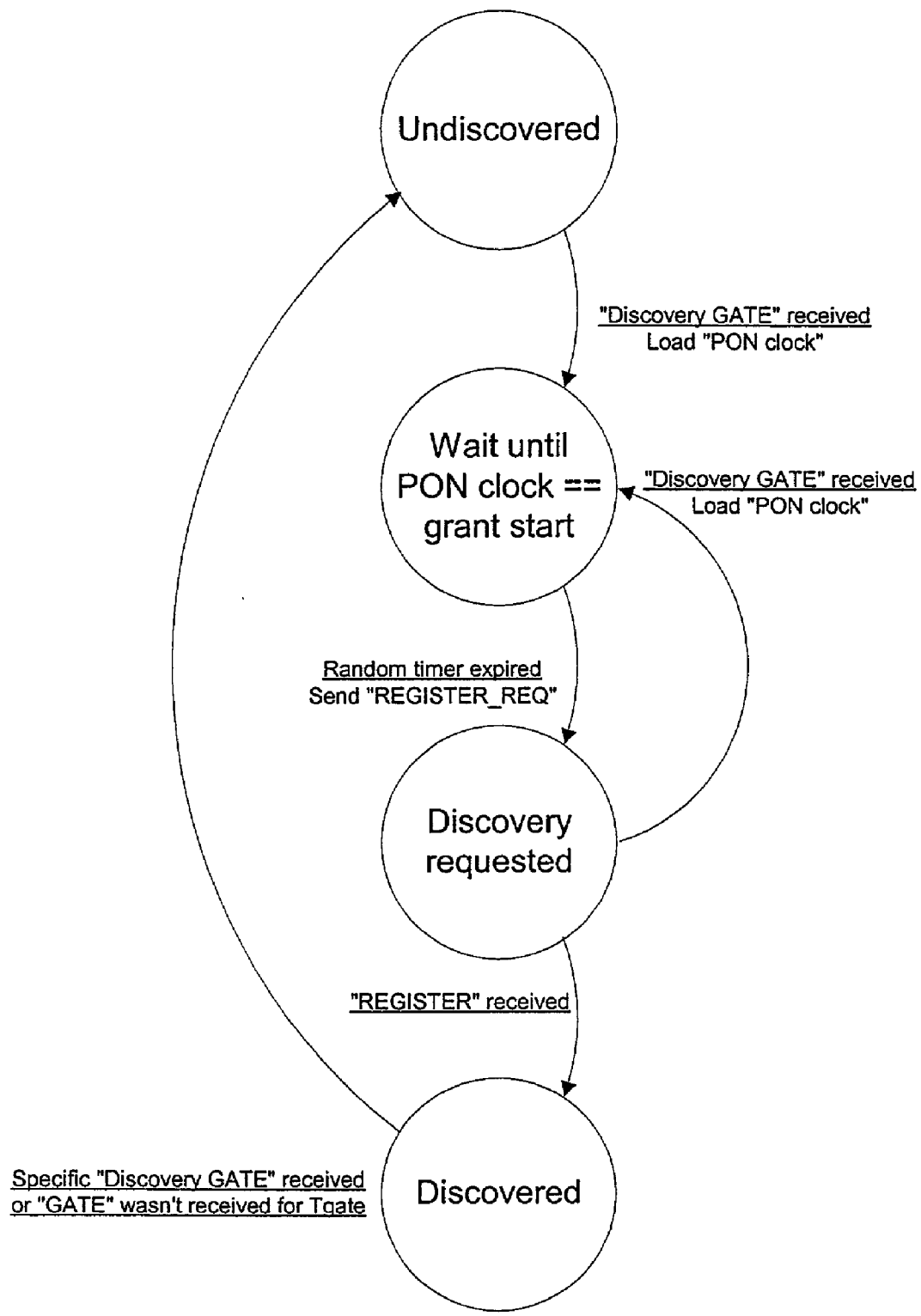
FIG. 5 illustrates a diagram of an ONU's state machine controlling the processes of ONU discovery and detection of loss of connection.

The ONUs run their own timeout routines that monitor the receipt of GATE messages. In a sixth exemplary non-limiting embodiment, an ONU resets it local timeout timer after each successfully received GATE message. If the local timeout timer reaches a preprogrammed threshold before being reset, the ONU assumes that the physical or logical connection with the OLT has been lost. The ONU then changes its state to undiscovered and awaits the next GATE message sent as part of the discovery process. FIGS. 4 and 5 illustrate the states and transitions of the OLT's and ONU's state machines that govern the discovery and detection of connection loss processes. In a seventh exemplary non-limiting embodiment, the data exchange between the OLT and the ONUs conforms to the Ethernet standard IEEE 802.3. The OLT encrypts the downlink traffic to allow only the addressed ONU to understand the data packets sent. The downlink Ethernet packets are encrypted with a block encryption algorithm at the physical sublayer level. The algorithm conforms to the Advanced Encryption Standard (AES) promulgated by the National Institute of Standards and Technology. Non AES-conforming encryption algorithms can also be used.

Figure 6:
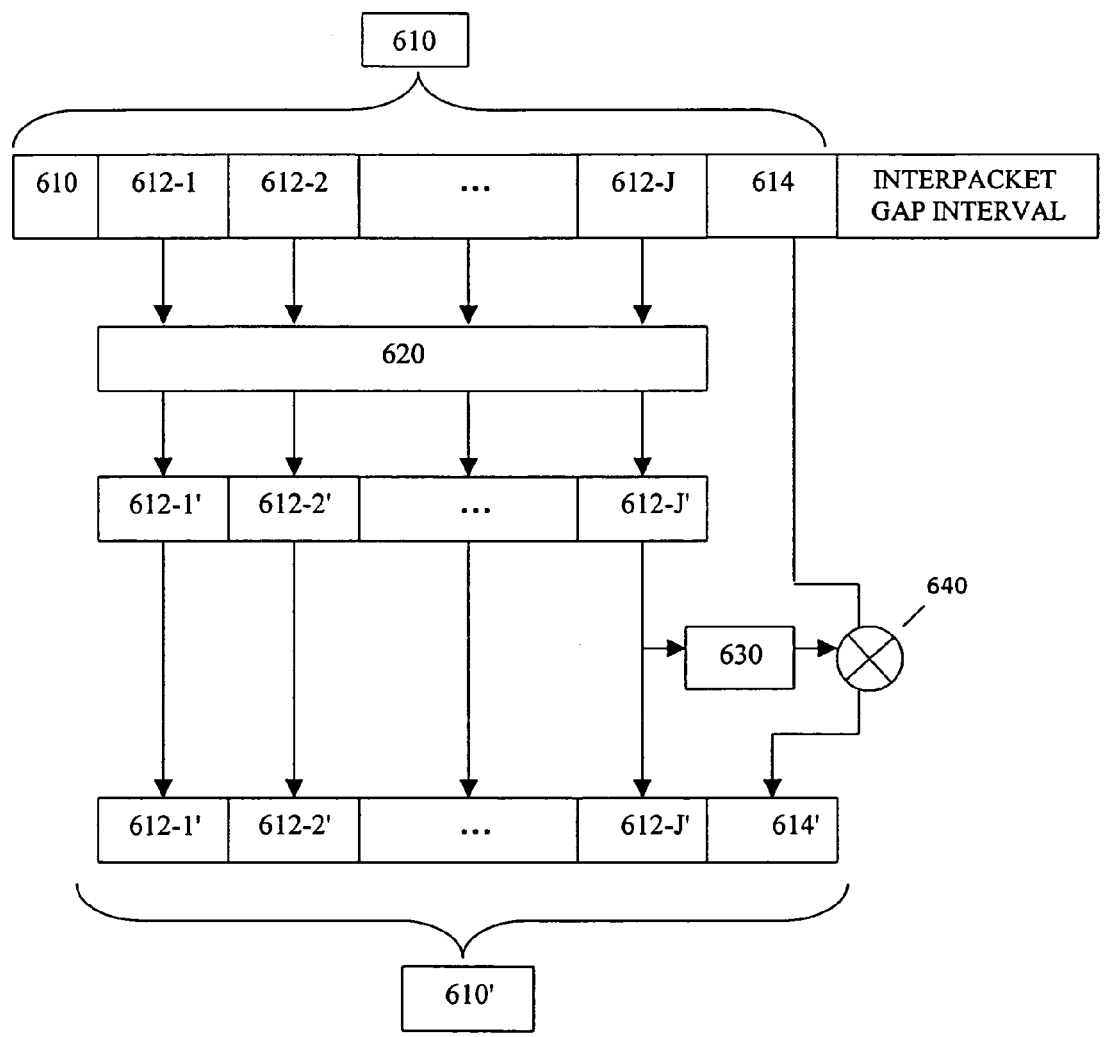
FIG. 6 illustrates the process of encryption of a downlink packet comprising multiple N-byte payload blocks and a short payload block.

The block encryption of the seventh embodiment is described with reference to FIG. 6. Each packet 610 is broken into N-byte-long blocks 612-1 through 612-J, and the last block having n bytes (n≦N). Each N-byte-long block is encrypted independently by encryption process 620, resulting in encrypted blocks 612-1' through 612-J'. If the last block is a short block, i.e., n<N, then the encrypted next-to-last block 612-J is encrypted again using encryption process 630, which may be the same as the encryption process 620. The short block is then XOR-ed with the twice-encrypted next-to-last block. In FIG. 6, the XOR process is designated with numeral 640. The resulting encrypted packet 610' comprises the encrypted blocks 612-1' through 612-J', and the encrypted short block 614'.

In the seventh embodiment, each ONU periodically generates new encryption keys and transmits them to the OLT along with the keys' identifiers (IDs), which may include the keys' sequence numbers. Every downlink packet transmitted by the OLT contains a header with the packet's encryption key ID and key sequence number. When the ONU receives a packet, it compares the received packet's key ID to the ONU's own key ID. If the key IDs match, the ONU decrypts the packet. Otherwise, the ONU discards the packet. In this way, privacy of communications is maintained despite the fact that the downlink transmissions are received by all ONUs.

The ONU initiates a new key replacement sequence by transmitting a NEW_KEY message to the OLT. The message contains the next key for the OLT to use in encrypting the messages intended for the ONU, and an identifier of the key, which can be the key's sequence number. The sequence number can be simply the current key's sequence number incremented by one. A representative NEW_KEY message is graphically illustrated in Table 5 below.

TABLE 5 graphical illustration of a NEW KEY message

| Field name | Length | Description |
| --- | --- | --- |
| Source Address | 6 bytes | Address of the ONU |
| Destination address | 6 bytes | Address of the OLT/Multicast |
| Packet type | 2 bytes | MAC control 0x8808 |
| MAC control opcode | 2 bytes | NEW_KEY_OPCODE |
| Timestamp | 4 bytes | Value of current local clock |
| New Key | 16 bytes | New key to use |
| Sequence number | 1 bytes | Sequence number of new key |

Alternatively, the OLT can initiate a key replacement sequence by requesting a new key from the ONU in a NEW_KEY_REQUEST control message.

The OLT does not explicitly acknowledge the NEW_KEY message. Instead, the OLT begins to use the new key to encrypt the downlink traffic, and specifies the new key sequence number (or other ID) in the headers of the encrypted packets. The ONU recognizes the new key from the key's ID and begins to decrypt the traffic using the new key. If the OLT has not switched to the new key within a predefined time, the ONU retransmits the NEW_KEY message. In the seventh embodiment, the ONU periodically replaces the encryption key.

Figure 7:
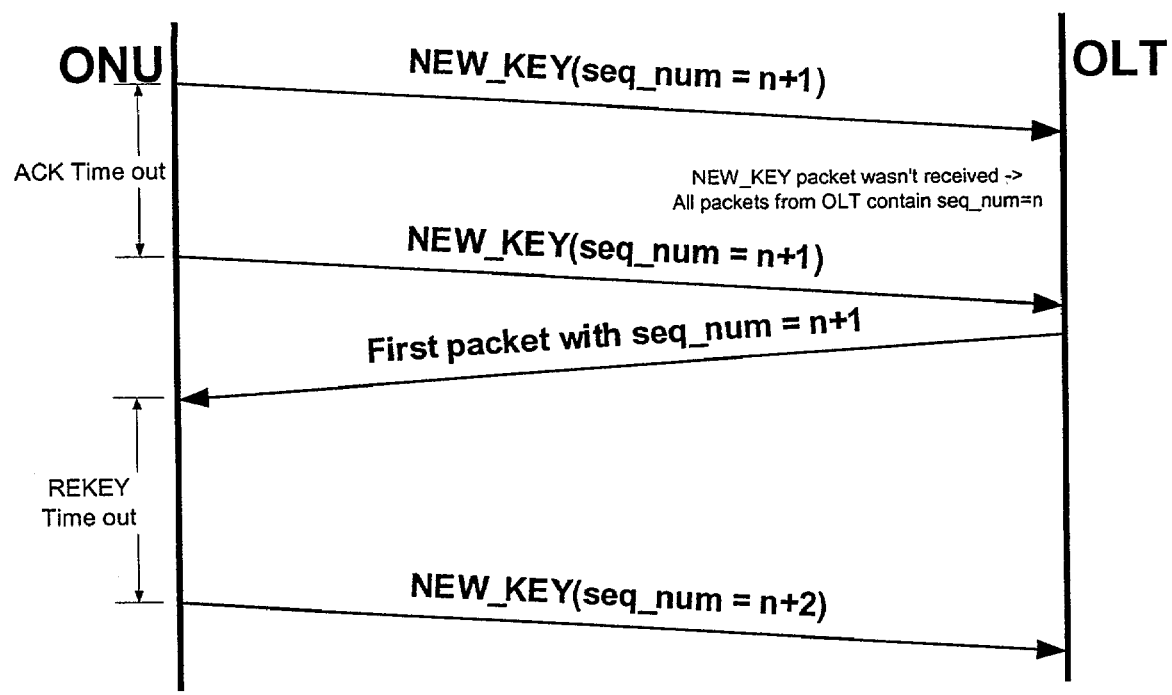
FIG. 7 illustrates encryption key replacement process with a NEW_KEY message retransmission.

The flow of the key replacement process with a NEW_KEY message retransmission is illustrated in FIG. 7.

We have described the invention and some of its features in considerable detail for illustration purposes. Neither the specific embodiments of the invention as a whole nor those of its features limit the general principles underlying the invention. In particular, the invention is not limited to an optical network, to connecting ONUs or customer premises equipment to a network, or to the use of AES-conforming encryption algorithms. The specific control messages illustrated in the tables of this specification contain fields that are not necessary to the operation of the invention, and do not contain other fields that can be added to these control messages. Moreover, the lengths of the specific fields within the control messages can vary from the lengths shown in the Tables above. For example, the New Key field in the NEW_KEY message can be increased to accommodate longer encryption keys. Many additional modifications are intended in the foregoing disclosure, and it will be appreciated by those of ordinary skill in the art that in some instances some features of the invention will be employed in the absence of a corresponding use of other features. The illustrative examples therefore do not define the metes and bounds of the invention, which function has been reserved for the following claims and their equivalents when considered in conjunction with the rest of this specification.

We claim:

1. A method for transferring data between a central controller and a first node of a plurality of remote network nodes over a digital data network having a passive optical network topology, the network connecting the central controller and the plurality of remote network nodes, the method comprising the steps of:
discovering the first node by the central controller;
synchronizing the internal clock of the first node to the internal clock of the central controller;
measuring a round trip delay from the central controller to the first node;

transmitting uplink data from the first node to the central controller using IEEE 802.3 Ethernet standard packets, in response to transmission authorizations sent by the central controller to the first node; and transmitting downlink data from the central controller to the first node using IEEE 802.3 Ethernet standard packets wherein the steps of discovering and synchronizing comprise the steps of:

sending a GATE message from the central controller to undiscovered nodes, said GATE message sent to the undiscovered nodes comprising a time stamp of the central controller, a first grant start time value, a first grant length value, and a first GATE message MAC control opcode;

receiving at the first node the GATE message addressed to the undiscovered nodes;

setting the internal clock of the first node to the time stamp of the GATE message addressed to the undiscovered nodes;

after the setting step, sending a REGISTER_REQUEST message from the first node to the central controller between the time when the internal clock of the first node equals the first grant start time value and the time when the internal clock of the first node equals to the sum of the first grant start time value and the first grant length value, the REGISTER_REQUEST message comprising a time stamp of the first node, address of the first node, and a REGISTER_REQUEST message MAC control opcode; and in response to receiving the REGISTER_REQUEST message at the central controller, sending a REGISTER message to the address of the first node, the REGISTER message comprising a REGISTER message MAC control opcode.

2. A method of transferring data according to claim 1, wherein the step of transmitting uplink data comprises the steps of:

sending the transmission authorizations to the address of the first node, the transmission authorizations comprising a plurality of GATE messages sent to the address of the first node, each GATE message of the plurality of GATE messages sent to the address of the first node comprising a second GATE message MAC control opcode and at least one pair of one grant start time value and one grant length value, each said pair defining one allowable uplink transmission interval;

sending the uplink data from the first node to the central controller in response to receiving a GATE message at the first node, each packet of the uplink data being transmitted during an allowable uplink transmission interval.

3. A method of transferring data according to claim 2, wherein at least one GATE message of the plurality of GATE messages sent to the address of the first node comprises at least two pairs of one grant start time value and one grant length value.

4. A method of transferring data according to claim 2, wherein the step of measuring round trip delay comprises the step of subtracting a first time stamp of the first node in a first message received by the central controller from the value of the real time clock of the central controller at the time the first message is received.

5. A method of transferring data according to claim 4, further comprising the steps of:

sending an encryption key from the first node to the central controller; and encrypting the downlink data transmitted by the central controller to the address of the first node using the encryption key.

6. A method of transferring data according to claim 5, wherein the downlink data is transmitted in packets, each packet comprising a header and a payload, wherein encrypting the downlink data comprises the step for block encrypting the payload of said each packet.

7. A method of transferring data according to claim 4, further comprising the steps of:

the central controller sending a request for an encryption key to the first node;

sending an encryption key from the first node to the central controller in response to the request for an encryption key; and encrypting the downlink data transmitted by the central controller to the address of the first node using the encryption key.

8. A method of transferring data according to claim 5, wherein the step of sending an encryption key comprises the step of sending a NEW_KEY message from the first node to the central controller, the NEW_KEY message comprising the address of the first node, a NEW_KEY message MAC control opcode, the encryption key, and an identifier of the encryption key.

9. A method of transferring data according to claim 8, wherein the downlink data is sent in packets, each packet comprising a header that comprises the identifier of the encryption key used to encrypt the packet.

10. A method of transferring data according to claim 4, further comprising the steps of:

periodically sending a different encryption key from the first node to the central controller;

encrypting the downlink data transmitted by the central controller to the address of the first node using the last received encryption key.

11. A method of transferring data according to claim 10, wherein:

the step of periodically sending a different encryption key comprises the step of periodically sending a different NEW_KEY message from the first node to the central controller, each NEW_KEY message comprising the address of the first node, a NEW_KEY message MAC control opeode, an encryption key, and the sequence number of the encryption key comprised in said each NEW_KEY message, the step of periodically sending a different NEW_KEY message comprising the step of sending a first NEW_KEY message comprising a first encryption key and a first sequence number corresponding to the first encryption key;

the downlink data is sent in packets, each packet comprising a header that comprises the sequence number of the encryption key used to encrypt the packet;

the method further comprising the steps of: monitoring the sequence numbers in the headers of the downlink packets sent to the address of the first node;

and re-sending the first NEW_KEY message to the central controller if none of the monitored sequence numbers matches the first sequence number within a first predetermined time period.

12. A method of transferring data according to claim 4, wherein the downlink data and the uplink data are transmitted using IEEE 802.3 Ethernet standard packets.

13. A method for transferring data according to claim 12, wherein the network is a passive optical network.

14. A method for transferring data according to claim 13, wherein the step of transmitting uplink data further comprises the step of the first node transmitting REPORT messages to the central controller, each REPORT message comprising the address of the first node, at least one request for uplink transmission of a first number of bytes from a queue of the first node, and a REPORT message MAC control opcode;

and the central controller sends the GATE messages of the plurality of GATE messages sent to the address of the first node in response to receiving the REPORT messages.

15. A method for transferring data according to claim 14, wherein said each REPORT message further comprises a priority indication of the queue.

16. A method for transferring data according to claim 14, further comprising the step of detecting connection failure between the central controller and the first node.

17. A method for transferring data according to claim 16, wherein the step of detecting connection failure comprises the steps of: resetting a first timer at the central controller each time a REPORT message is received from the first node;

and discontinuing sending of the GATE messages to the address of the first node if the first timer reaches a first timeout value.

18. A method for transferring data according to claim 17, wherein the step of detecting connection failure further comprises the steps of:

resetting a second timer at the first node each time a GATE message sent to the address of the first node is received at the first node;

if the second timer reaches a second timer timeout value, repeating the steps of discovering and synchronizing.

19. A method for transferring data between an optical line terminal (OLT) and a first optical network unit (ONU) of a plurality of ONUs over a passive optical network, the method comprising the steps of:

the first ONU receiving a GATE message addressed to undiscovered nodes, the GATE message comprising a time stamp of the OLT, a first grant start time value, a first grant length value, and a GATE message MAC control opcode;

setting the internal real time clock of the first ONU to the time stamp of the OLT;

after the setting step, sending a REGISTER_REQUEST message from the first ONU to the OLT during the time interval defined by the first grant start time value and the sum of the first grant start value and the first grant length value, the REGISTER_REQUEST message comprising a time stamp of the first ONU, the address of the first ONU, and a REGISTER_REQUEST message MAC control opcode;

receiving a REGISTER message addressed to the address of the first ONU, the REGISTER message comprising a REGISTER message MAC control opcode;

receiving GATE messages addressed to the address of the first ONU, each received GATE message comprising the GATE message MAC control opcode and one or more definitions of allowed uplink transmission intervals; and sending uplink data packets from the first ONU to the OLT only during the allowed transmission intervals.

20. A method for transferring data according to claim 19, wherein the REGISTER_REQUEST message is sent beginning at a random time $T_r$ uniformly distributed within the time period beginning with the first grant start time value and ending with $T_e$=(the first grant start time value)+(the first grant length value)−($T_1$), where $T_1$ is equal to the length of the REGISTER_REQUEST message.

21. A method for transferring data according to claim 19, further comprising the steps of: sending a first encryption key and a first sequence number of the first encryption key from the first ONU to the OLT, to enable the OLT to encrypt downlink data packets addressed to the address of the first ONU with the encryption key.

22. A method for transferring data according to claim 21, further comprising the steps of: receiving, at the first ONU, the downlink data packets addressed to the address of the first ONU, each downlink data packet comprising a header comprising the sequence number of the key used in encrypting said each downlink data packet; monitoring, at the first ONU, the sequence numbers in the headers of the received downlink data packets; if none of the sequence numbers in the headers of the downlink data packets received within a first predetermined period matches the first sequence number, re-sending the first encryption key and the first sequence number from the first ONU to the OLT.

23. A method for transferring data according to claim 22, wherein the downlink data packets and the uplink data packets conform to the IEEE 802.3 Ethernet standard.

24. A method for transferring data according to claim 23, further comprising the step of periodically sending REPORT messages from the first ONU to the OLT, each said REPORT message requesting allocation of one or more time intervals for transmission of the uplink data packets from the first ONU to the OLT.

25. A method for transferring data according to claim 23, further comprising the steps of:

the first ONU detecting failure of connection between the first ONU and the OLT; and after detecting failure of connection between the first ONU and the OLT, the first ONU repeating, in order, the steps of receiving a GATE message addressed to undiscovered nodes, setting the internal real time clock of the first ONU, sending a REGISTER_REQUEST message from the first ONU to the OLT, and receiving a REGISTER message addressed to the address of the first ONU.

26. A method for transferring data between an optical line terminal (OLT) and a first optical network unit (ONU) of a plurality of ONUs over a passive optical network, the method comprising the steps of:

sending a first GATE message from the OLT to undiscovered ONUs, the first GATE message comprising a time stamp of the OLT, a first grant start time value, a first grant length value, and a first GATE message MAC control opcode;

receiving at the OLT a REGISTER_REQUEST message from the first ONU, the REGISTER_REQUEST message comprising a time stamp of the first ONU, an address of the first ONU, and a REGISTER_REQUEST message MAC control opcode;

in response to receiving the REGISTER_REQUEST message, sending from the OLT a REGISTER message to the address of the first ONU, the REGISTER message comprising a REGISTER message MAC control opcode;

periodically sending GATE messages to the address of the first ONU, each said GATE message sent to the address of the first ONU comprising the GATE message MAC control opcode and at least one pair of one grant start time value and one grant length value, each said pair defining a time interval during which the first ONU is allowed to send messages to the OLT; and receiving uplink data packets from the first ONU in the time intervals during which the first ONU is allowed to send messages to the OLT.

27. A method for transferring data according to claim 26, further comprising the steps of: receiving, at the OLT, an encryption key sent by the first ONU; and sending, from the OLT to the first ONU, downlink data packets encrypted with the key.

28. A method for transferring data according to claim 27, further comprising the step of measuring round trip delay between the OLT and the first ONU by subtracting a first time stamp of the first ONU comprised in a first message received by the OLT from the first ONU from the value of the internal clock of the OLT at the time the first message is received by the OLT.

29. A method for transferring data according to claim 27, wherein the downlink and uplink data packets are transmitted using IEEE 802.3 Ethernet standard.

30. A method for transferring data according to claim 29, further comprising the step of: receiving REPORT messages from the first ONU, each REPORT message received from the first ONU comprising at least one request for uplink transmission of a first number of bytes; wherein the GLT sends the GATE messages to the address of the first ONU in response to the received REPORT messages.

31. A method for transferring data according to claim 30, further comprising the steps of: resetting a first timer at the GLT each time a REPORT message is received from the first ONU; and discontinuing sending of the GATE messages to the address of the first ONU if the first timer reaches a first timeout value.

* * * * *

UNITED STATES PATENT AND TRADEMARK OFFICE
CERTIFICATE OF CORRECTION

PATENT NO. : 7,301,968 B2
APPLICATION NO. : 10/091141
DATED : November 27, 2007
INVENTOR(S) : Onn Haran, Ariel Maislos and Lior Khermosh Page 1 of 1

It is certified that error appears in the above-identified patent and that said Letters Patent is hereby corrected as shown below:

Claims 30 and 31, column 14 should be corrected as follows:

Lines 6 and 10: change "GLT" to --OLT--

Signed and Sealed this

Eighth Day of April, 2008

JON W. DUDAS
*Director of the United States Patent and Trademark Office*